United States Patent Office 3,705,793
Patented Dec. 12, 1972

---

3,705,793
CHEMICAL SOIL IMPROVER
Konstantin Alexandrovich Mikhelis and Alexandr Sergeevna Fomina, Tallin, Kirill Vladimirovich Murumets and Yalmar Semenovich Ulanen, Kiviyli, Anatoly Mikhailovich Kotov, Timofei Mikhailovich Volkov and Boris Semenovich Itsikson, Moscow, Raivo Alexandrovich Suurmaa and Paavo Yaanovich Viks, Kiviyli, and Georgy Grigorievich Berestovsky, Kazakhskaya, U.S.S.R., assignors to Slantsekhimichesky Kombinat "Kiviyli" U.S.S.R., Kiviyli, Estonskoi SSR
No Drawing. Filed Nov. 20, 1969, Ser. No. 878,555
Int. Cl. C05f 11/00
U.S. Cl. 71—24
15 Claims

ABSTRACT OF THE DISCLOSURE

A chemical soil improver noted for its complex effects and comprising tar obtained by low-temperature carbonization of caustobioliths.

Depending upon climatic conditions and physico-chemical characteristics, the following additives may be incorporated into said soil improver: elemental sulfur, Formalin, wastes of oil shale processing into carboxylic acids, surfactants or pyrite cinder.

The chemical soil improver is primarily intended for soil stabilization or planting, for the control of harmful soil organisms and weeds, for pre-emergence control of weeds, and also for increasing the yields of diverse crops in all soil and climatic zones.

---

This invention relates to soil improvers of chemical action.

Chemical soil improvers are known, such as petroleum asphalt emulsion, latexes and polyacrylamide (employed in the U.S.S.R.); a mixture of rubber and mineral oils; and butadiene-styrene (employed in Great Britain).

As a rule, all previously known improvers have only one or two effects on the soil treated. For example, petroleum asphalt emulsion is used to prevent erosion but this leads to extensive bituminization of the soil.

Latexes, polyacrylamide, mixtures of rubber and mineral oils, as well as butadiene-styrene are predominantly employed only to prevent soil erosion.

In addition, the foregoing improvers are expensive products and the process for the production of asphalt emulsion is very complicated.

Polymeric improvers are likewise known which are employed for the prevention of soil erosion and for moisture conservation in arid regions (cf. U.S. Patent 2,961,799).

It is also known to employ herbicides, insecticides and fungicides to control weeds and harmful insects and other field pests.

It is the primary object of our invention to provide a soil improver of combined action suitable simultaneously for the control of soil erosion, weeds and field pests and also for conditioning the soil, which requires only a single application.

This object has been accomplished by the provision of a chemical soil improver which, according to the invention, is based on tars produced by low-temperature carbonization of caustobioliths.

To increase the stability of the improver on the soil it is advantageous to include in the composition elemental sulphur in the amount of not more than 1.0% of the base by weight.

Formalin is advantageously included in the composition of the improver in the amount of 3–10% of the base by weight to improve the adhesive properties of the improver and thus increase the strength of the film formed on the soil. Formalin also increases the stability of the improver in field conditions.

The inclusion in the improver of wastes from the production of carboxy acids from bituminous shale increases the stimulating effect of the improver on plant growth. It is advisable to add said wastes to the improver in the amount of not more than 0.1% of the base by weight.

Surface-active substances lower the viscosity of the improver and increase its adhesion to the mineral particles of the soil. The advisable content of such substances in the improver is up to 5% of the base by weight.

Pyrite cinder in the amount of up to 1% of the base by weight increases the improver's stimulating effect on plant growth since the microelements in the pyrite cinder which are valuable fertilizers are converted into a readily available form.

The invention will now be described in detail and illustrated with concrete examples.

The soil improver, according to the invention, comprises tars produced by the low-temperature carbonization of caustobioliths, containing, in combination or separately, the following additions, expressed in percent of said tars by weight: elemental sulphur, not more than 1%, Formalin 3–10%, wastes from the production of carboxy acids from bituminous shale up to 0.1%, surface-active substances up to 5% and pyrite cinder up to 1%.

The soil improver is produced by the low-temperature carbonization of caustobioliths, in particular, bituminous shale, by the conventional method, employing any industrial installation designed for the low-temperature carbonization of caustobioliths.

An improver of the composition specified in the invention has a combined action on the soil.

By forming on the surface of the soil a sufficiently strong and stable film or crust (depending on the amount applied), the improver protects the soil from erosion (including shifting sand, mine dumps, etc.). The improver also destroys annual weeds on contact and also the overground parts of perennial weeds; destroys insect pests, harmful fungi and other pests; on decomposition has a stimulating effect on the growth of cultivated plants; increases the heat-absorbing capacity of the soil and lowers moisture evaporation from the soil. In addition, by means of this improver, soils destroyed by wind erosion can be restored.

In plants grown on soil treated with this improver process of photosynthesis proceeds more vigorously and the content of protein, sugars and starch is higher.

Another merit of the present soil improver is that in field conditions as a result of atmospheric oxidation and the action of soil microorganisms it is completely decomposed in a period of from two weeks to a year and a half, depending on regional climatic conditions. This property of the improver is conducive to preventing the soil from being bituminized. The period of stability of the improver is regulated by the addition of stabilizers, such as sulphur or Formalin.

Since the improver possesses high adhesive properties with respect to the mineral particles of the soil, its use is particularly effective in desert or semi-desert areas.

The improver is applied to the soil by means of any ground or air equipment designed for the application of such liquids.

Hereinbelow are given examples of compositions of the soil improver with a description of the effects obtained. Compositions are given in percent.

EXAMPLE 1

| | |
|---|---|
| Alkyl phenols | 17.4 |
| Asphaltenes | 11.3 |
| Carboxy acids | 0.4 |
| Nitrogen compounds | 0.5 |
| Paraffins } Olefins } Naphthenes | 8.2 |
| Alkyl-aromatic compounds | 12.4 |
| Polycyclic aromatic compounds | 9.8 |
| Neutral oxygen compounds | 40.0 |

When the above improver was applied at an average rate of 1–5 tons per hectare in an arid region to soils which suffered badly from wind erosion, erosion was immediately stopped.

The film preventing wind erosion was retained on the soil for 3 to 6 months, chiefly depending on climatic conditions.

When the improver came in contact with weeds which had already come up, all annual weeds and the overground parts of perennial weeds were destroyed.

Average yields of wheat and maize increased by approximately 20%. The improver had completely decomposed by the time of the next sowing.

When an improver of the above composition was applied to moist soils in areas with a warm winter at the rate of 0.5 ton per hectare, average yields of rye and wheat were increased by 50%, largely due to inhibition of the growth of snow mold, to which fields in such climatic regions are subject.

Other characteristics were similar to those for arid conditions.

EXAMPLE 2

| | |
|---|---|
| Paraffins | 4.4 |
| Olefins | 3.8 |
| Aromatic compounds | 22.2 |
| Heteroatomic compounds | 69.6 |

Elemental sulphur 0.1% of the aggregate weight of the above components (above 100%).

The improver was used on carbonate soils in damp areas for potato crops (applied 15 days after planting).

The improver was applied at the rate of 0.5 ton per hectare. Annular weeds which had come up were completely destroyed, as were the overground parts of perennials; soil temperature was raised by 1–3° C.; average potato yields were increased by approximately 100%, while the starch content increased by 1–2%. Complete decomposition of the improver took place in 3 weeks.

Employment of this improver in the same climatic conditions on winter rye sowings increased average yields by 20%, other characteristic being the same as those given above in this example.

EXAMPLE 3

| | |
|---|---|
| Paraffins | 4.4 |
| Olefins | 3.8 |
| Aromatic compounds | 22.2 |
| Heteroatomic compounds | 69.6 |

Wastes from the production of carboxy acids from shale 0.1% (above 100%).

The improver was applied to carbonate soils in damp climatic conditions at a rate of 0.5 ton per hectare on potato plantings.

Average potato yields were increased by 100%, while the starch content increased by 1.4%.

Other characteristics were similar to those for the preceding improver.

EXAMPLE 4

| | |
|---|---|
| Paraffins | 9.6 |
| Olefins | 7.7 |
| Aromatic compounds | 48.4 |
| Asphaltenes | 6.6 |
| Phenols | 2.5 |
| Heteroatomic compounds | 22.8 |
| Nitrogen compounds | 2.4 |
| Total alkyl phenols (above 100%) | 20 |

The improver was used in a hot arid area on cotton plantings. Soil temperature during the cold spring period was raised by 2–3° C., something which is very important for the sprouting of cotton seed; soil moisture during the dry period was increased by 2–3%. Soil erosion was practically absent, even when wind velocities reached 28–30 metres per sec. The average cotton yield increased by 100%.

Other characteristics were similar to those given in preceding examples.

EXAMPLE 5

| | |
|---|---|
| Paraffins | 4.4 |
| Olefins | 3.8 |
| Aromatic compounds | 22.2 |
| Heteroatomic compounds | 69.6 |

The improver was applied to moving sands in deserts and semideserts at the rate of 3 tons per hectare to protect the sand cover of gas pipe lines, oil pipe lines and water conduits from wind erosion.

Application of the improver caused the formation of a strong crust on the surface of the sand from 3 to 15 mm. thick, which retained its antideflation properties for a year. The present method of protection of the above structures is 20 times cheaper than mechanical protection by means of rush or wicker mats and enables application over long distances in short periods of time.

EXAMPLE 6

An improver of the same composition as in Example 5 but with the addition of Formalin in the amount of 10% of the base was applied to sands at the rate of 2 tons per hectare. Application of the improver caused the formation of a crust which remained intact for over a year.

EXAMPLE 7

| | |
|---|---|
| Alkyl phenols | 17.4 |
| Asphaltenes | 11.3 |
| Carboxy acids | 0.4 |
| Nitrogen compounds | 0.5 |
| Paraffins } Olefins } Naphthenes | 8.2 |
| Alkyl-aromatic compounds | 12.4 |
| Polycyclic aromatic compounds | 9.8 |
| Neutral oxygen compounds | 40.0 |
| Sulphonol (above 100%) | 3 |
| Pyrite cinder (above 100%) | 0.5 |

The improver was applied to improverished soils on sowings of winter rye at a rate of 0.5 ton per hectare. This gave an increase of approximately 30% in average yields.

Application of the improver was more uniform because of the addition of sulphonol which is a surface-active substance.

We claim:

1. A soil treating composition which comprises a tar obtained by low temperature carbonization of a caustobiolith and Formalin in an amount of from 3 to 10% by weight of the tar.

2. A soil treating composition as in claim 1 which further comprises up to 1% by weight of the tar of elemental sulphur.

3. A soil treating composition as in claim 1 which further comprises 0.1% by weight of the tar of wastes from the production of carboxy acids from bituminous shale.

4. A soil treating composition as in claim 1 which further comprises up to 1% by weight of the tar of pyrite cinder.

5. A soil treating composition as in claim 1 which further comprises 3 to 5% by weight of the tar of surface-active substances.

6. A soil treating composition as in claim 1 wherein the tar contains by weight 4.4% paraffins, 3.8% olefins, 22.2% aromatic compounds and 69.6% heteroatomic compounds.

7. A soil treating composition as in claim 1 wherein the tar contains by weight 17.4% alkyl phenols, 11.3% asphaltenes, 0.4% carboxy acids, 0.5% nitrogen compounds, 8.2% paraffins, olefins and naphthenes, 12.4% alkyl-aromatic compounds, 9.8% polycyclic aromatic compounds and 40% neutral oxygen compounds.

8. A soil treating composition as in claim 1 wherein the tar contains by weight 9.6% paraffins, 7.7% olefins, 48.4% aromatic compounds, 6.6% asphaltenes, 2.5% phenols, 22.8% heteroatomic compounds and 2.4% nitrogen compounds.

9. A method of treating soil which comprises forming on the surface thereof a film or crust of a soil conditioning composition comprising the tar obtained by low temperature carbonization of a caustobiolith.

10. A method as in claim 9 wherein the caustobiolith is bituminous shale.

11. A method as in claim 9 wherein the composition further comprises elemental sulphur in an amount up to 1% by weight of the tar.

12. A method as in claim 9 wherein the composition further comprises Formalin in an amount of from 3 to 10% by weight of the tar.

13. A method as in claim 12 wherein the composition further comprises wastes from the production of carboxy acids from bituminous shale in an amount equal to 0.1% by weight of the tar.

14. A method as in claim 11 wherein the composition further comprises a surface-active substance in an amount equal to from 3 to 5% by weight of the tar.

15. A method as in claim 9 wherein the composition further comprises pyrite cinder in an amount up to 1% by weight of the tar.

References Cited

UNITED STATES PATENTS

| | | | |
|---|---|---|---|
| 3,398,186 | 8/1968 | Schwartz | 71—24 |
| 2,310,652 | 2/1943 | Peter | 71—24 |
| 2,390,264 | 12/1945 | Mohr | 71—24 |
| 2,867,944 | 1/1959 | Fletcher | 47—58 |
| 2,995,433 | 8/1961 | Goren et al. | 71—65 S.C. |
| 3,074,877 | 1/1963 | Friedman | 201—32 |
| 3,475,279 | 10/1969 | Bowman | 201—32 |
| 3,483,115 | 12/1969 | Haddad et al. | 201—32 |
| 3,526,494 | 9/1970 | Toyoda et al. | 71—64 S.C. |

CHARLES N. HART, Primary Examiner

U.S. Cl. X.R.

71—64 SC